United States Patent [19]

Kim

[11] Patent Number: 5,906,045
[45] Date of Patent: May 25, 1999

[54] METHOD OF MANUFACTURING A CONDENSER FOR A REFRIGERATOR

[75] Inventor: Young-Nam Kim, Incheon, Rep. of Korea

[73] Assignee: Daewoo Electronics Co., Ltd., Seoul, Rep. of Korea

[21] Appl. No.: 08/865,937

[22] Filed: May 30, 1997

[30] Foreign Application Priority Data

Aug. 31, 1996 [KR] Rep. of Korea ......................... 96-37510

[51] Int. Cl.⁶ .................................................. B23P 15/26
[52] U.S. Cl. .................................. 29/890.07; 29/890.038
[58] Field of Search ........................... 29/890.07, 890.03, 29/890.038

[56] References Cited

U.S. PATENT DOCUMENTS

| | | | |
|---|---|---|---|
| 2,359,926 | 10/1944 | McCullough et al. | 29/890.038 |
| 2,732,615 | 1/1956 | Sandberg | 29/890.038 |
| 2,795,035 | 6/1957 | Kafer | 29/890.038 |
| 4,347,965 | 9/1982 | Grossman et al. | 29/890.038 |
| 4,870,735 | 10/1989 | Jahr, Jr. et al. | 29/890.038 |
| 5,398,752 | 3/1995 | Abbott . | |

FOREIGN PATENT DOCUMENTS 0113942 6/1984 Japan .
2090775 7/1982 United Kingdom .

*Primary Examiner*—Irene Cuda
*Attorney, Agent, or Firm*—Pillsbury Madison & Sutro LLP

[57] ABSTRACT

In a method of manufacturing a condenser for a refrigerator, a heat discharging tube is attached to a heat discharging plate made of ABS resin to improve a heat discharging effect of the condenser, while a back portion of the refrigerator is covered with the heat discharging plate to improve an external appearance. A heat discharging tube is disposed on a lower molding jig, and the heat discharging tube is covered with a heat discharging plate. An upper molding jig and a lower molding jig are combined with each other, and air is discharged between the lower molding jig and the heat discharging plate to create vacuum therebetween so that the heat discharging plate is combined to the heat discharging tube by a vacuum-sucking force. The heat discharging plate is refrigerated in a state of combining the heat discharging plate to the heat discharging tube after separating said upper molding jig and said lower molding jig from each other, and then the heat discharging plate integrally combined to the heat discharging tube is separated from the lower molding jig.

8 Claims, 4 Drawing Sheets

METHOD OF MANUFACTURING A CONDENSER FOR A REFRIGERATOR

BACKGROUND OF THE INVENTION

1. Field of the Invention

The present invention relates to a condenser of a refrigerator, and more particularly to a method of manufacturing a condenser for a refrigerator in which a heat discharging tube is attached to a heat discharging plate made of acrylonitrile-butadiene-styrene resin (hereinafter, referred to as ABS resin) to improve a heat discharging effect of the condenser, while a back portion of the refrigerator is covered with the heat discharging plate to improve an external appearance.

2. Description of the Prior Art

In general, a refrigerator typically includes a compressor for compressing an evaporated refrigerant, a condenser for absorbing heat from a compressed refrigerant and discharging the heat to the atmosphere so that the refrigerant can be liquefied, an expansion valve for reducing a pressure of the Uquefied refrigerant and expanding the refrigerant, and an evaporator for absorbing heat from the air of a room and evaporating the refrigerant. The devices are connected to each other by means of pipes which create a refrigerant pathway. The refrigerant undergoes phase changes while being repeatedly circulated through the pipes connecting the devices of the air conditioner to each other, thereby absorbing the heat from inner spaces of the refrigerator and discharging the heat to the atmosphere.

A refrigerating ability of the refrigerator is affected by an amount of the heat discharged from the condenser. The condenser of the refrigerator generally is disposed at a back portion of the refrigerator, where a refrigerant tube is attached to an expanded metal in one case and is sandwiched between two sheets of the expanded metal in another case. However, the expanded metal is a poor choice for a fin since the radio of material to an exposed surface is quite now.

U.S. Pat. No. 5,398,752 (issued to Roy W. Abbott on Mar. 21, 1995) discloses a lower cost method of manufacturing a louvered strip fin sheet and a heat exchanger 10 having a minimum strip fin of minimum depth to maximize a heat transfer of an air side.

FIG. 1 is a perspective view showing a method of lancing sheet material 22 into parallel rows of strip fins 24 by means of rotary cutters 20 according to Abbott's patient. FIG. 2 is perspective view showing an alternate method of lancing the sheet material 22 and shearing to a desired length by means of a punch and die set 26. FIG. 3 is a plan view of desired width and length of a completed heat exchanger 10, a side view of a serpentined tube 40 sandwiched between lanced sheets 28, and an expanded view of joints 42 between the serpentined tube 40 and unlanced strips 30 located between rows of lanced strip fins 24. As shown in FIG. 1, a roll of sheet stock 22 is pulled through a pair of rotary stock cutters 20 having cutting teeth which lance parallel rows of strip fins 24 separated by narrow unlanced strips 30 and edges 32 in lanced sheets 28. An alternate method is shown in FIG. 2. In FIG. 2, the punch and die 26 forms strip fins 24 in a sheet. In FIGS. 1 and 2, the combination of the punch and the die 26, or multiple lance cutting rolls 20 forms lanced sheets 28 as best shown in FIG. 3. A preformed tube assembly 40 can be seam welded, overlapping spot welded, laser welded, copper brazed, soldered, or adhesive bonded to steel and alloy lanced sheets; or laser seam welded, oven brazed, dip brazed, vacuum brazed, or adhesive bonded to aluminum, copper, and alloy lanced sheets to form the heat exchanger 10. As shown FIG. 3, the heat exchanger 10 is formed by joining lanced sheets 28 to the preformed tube 40 resulting in a double layer of strip fin sheet material due to overlapping a sheet of the unlanced strip 30 over the tubing 40 at the joints 42.

The heat exchanger 10 made in this concept allows independent selection of tube wall thickness and fin thickness. The tube wall thickness can be selected to meet any desired pressure containment specification while the fin thickness can be selected independently according to optimization of heat transfer, rigidity, and economical considerations.

In the method of manufacturing the strip fin sheet and the heat exchanger 10 according to the Abbott's patent, however, the stock cutters 20 or the combination of the punch and the die 26 lance the sheets and cut the lanced sheets 28 to a desired size. After that, the tube 40 is disposed between the two sheets and joints 42 between an unlanced portion of the sheets and the tube 40 must be welded or bonded by adhesive.

Accordingly, there is disadvantages in that a process for manufacturing the heat exchanger is complicated and it is difficult to weld or bond the tube to the sheets.

SUMMARY OF THE INVENTION

The present invention has been made to overcome the above described problems of the prior art. It is an object of the present invention to provide a method of manufacturing a condenser for a refrigerator in which a heat discharging tube is attached to a heat discharging plate made of ABS resin to improve a heat discharging effect of the condenser, while a back portion of the refrigerator is covered with the heat discharging plate to improve an external appearance.

To accomplish the above object of the present invention, there is provided a method of manufacturing a condenser for a refrigerator, comprising:

(1) a step for disposing a heat discharging tube on a lower molding jig;

(2) covering the heat discharging tube with a heat discharging plate;

(3) combining an upper molding jig and the lower molding jig to each other;

(4) a step for discharging an air between the lower molding jig and the heat discharging plate and creating a vacuum therebetween so that the heat discharging plate is combined with the heat discharging tube by a vacuum-sucking force;

(5) a step for cooling the head discharging plate while combining the heat discharging plate to the heat discharging tube after separating the upper molding jig and the lower molding jig from each other; and (6) a step for separating the heat discharging plate integrally combined to the heat discharging tube from the lower molding jig.

The method of manufacturing the condenser according to the present invention further comprises a step for preheating the heat discharging plate at a predetermined temperature before the step (2).

At the preheating step, the heat discharging plate is heated at 300° C. for fifteen seconds by means of heaters, and the heat discharging plate is made of ABS resin and has a thickness of 0.6 mm.

A degree of vacuum between the heat discharging plate and the lower molding jig at the step (4) is about 0.987.

The upper and lower molding jigs have a square shape, and the lower molding jig has a tube supporting plate disposed to a position at a predetermined distance apart from a bottom surface of the lower molding jig and having a plurality of thruholes therein.

Diameters of the thruholes performed in the tube supporting plate of the lower molding jig are about 0.8 mm to 1.2 mm.

At the step (5), the heat discharging plate is cooled by air.

At the step (6), air is supplied between the heat discharging plate and the lower molding jig through an aperture formed at a lower portion of a wall of the lower molding jig so that a combination of the heat discharging tube and the heat discharging plate is separated from the lower molding jig.

As described above, when manufacturing the condenser for the refrigerator according to the method of manufacturing the condenser for the refrigerator of the present invention, it is possible to improve heat discharging efficiency of the condenser by integrally combining the heat discharging tube of the condenser with the heat discharging plate made of ABS resin, while it can be possible to improve an external appearance of the refrigerator by covering the rear portion of the refrigerator with the condenser.

Furthermore, since the method of manufacturing the condenser for the refrigerator according to the present invention does not require the heat discharging tube to be welded or bonded to the heat discharging plate or expanded metal, the manufacturing process of the condenser for the refrigerator is simplified, so the condenser for the refrigerator can be easily manufactured.

BRIEF DESCRIPTION OF THE DRAWINGS

The above object and other advantages of the present invention will become more apparent by describing in detail the preferred embodiment thereof with reference to the attached drawings, in which:

FIG. 6A and 6B show the condenser manufactured by using the method of the vacuum molding according to the embodiment of the present invention, in which FIG. 6A is a plan view of the condenser and FIG. 6B is a sectional view of the condenser.

DESCRIPTION OF THE PREFERRED EMBODIMENT

Hereinafter, a preferred embodiment of the present invention will be described in detail with reference to the accompanying drawings.

Figure 1:
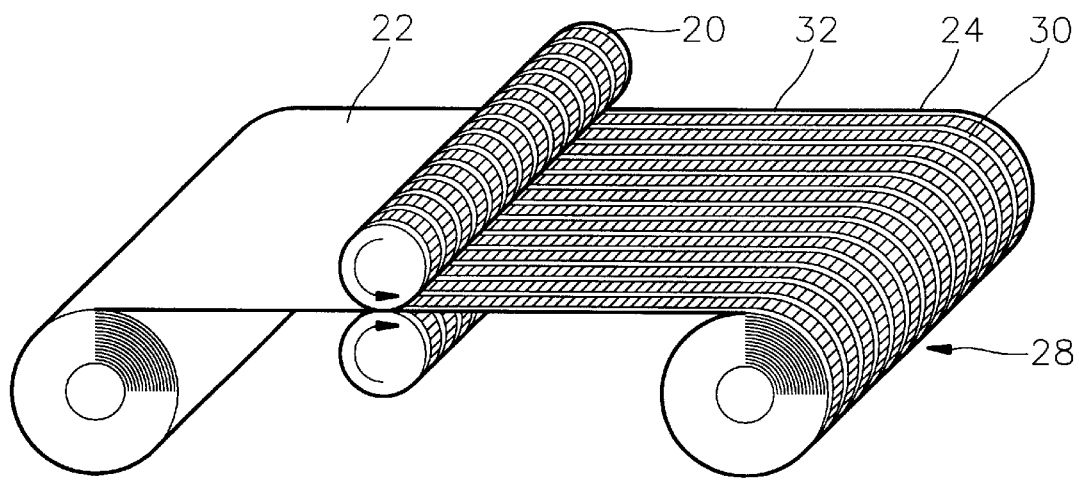
FIG. 1 is a perspective view showing a method of lancing sheet material into parallel rows of strip fins by means of rotary cutters according to an embodiment of the conventional art.
Figure 2:
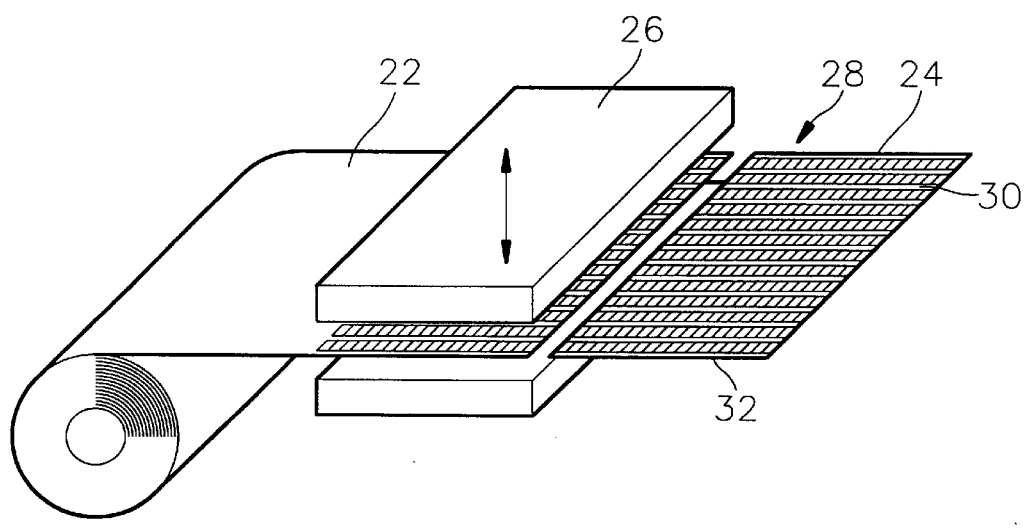
FIG. 2 is a perspective view showing an alternate method of lancing the sheet and shearing to a desired length by means of a punch and die set according to another embodiment of the conventional art.
Figure 3:
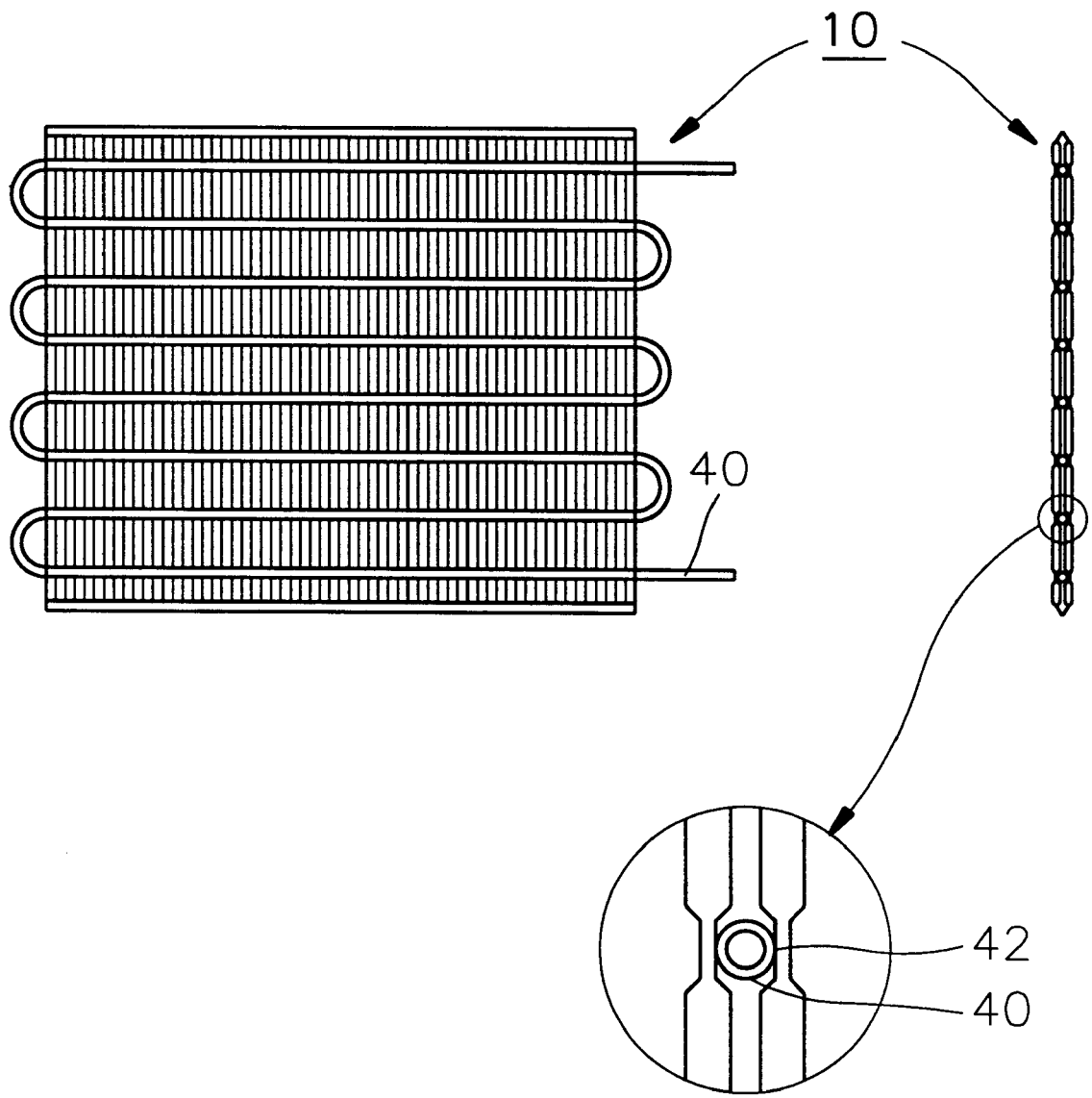
FIG. 3 is a plan view of desired width and length of a completed heat exchanger, a side view of a serpendned tube sandwiched between lanced sheets, and an expanded view of joints between a tube and unlanced strips located between rows of lanced strip fins.
Figure 4:
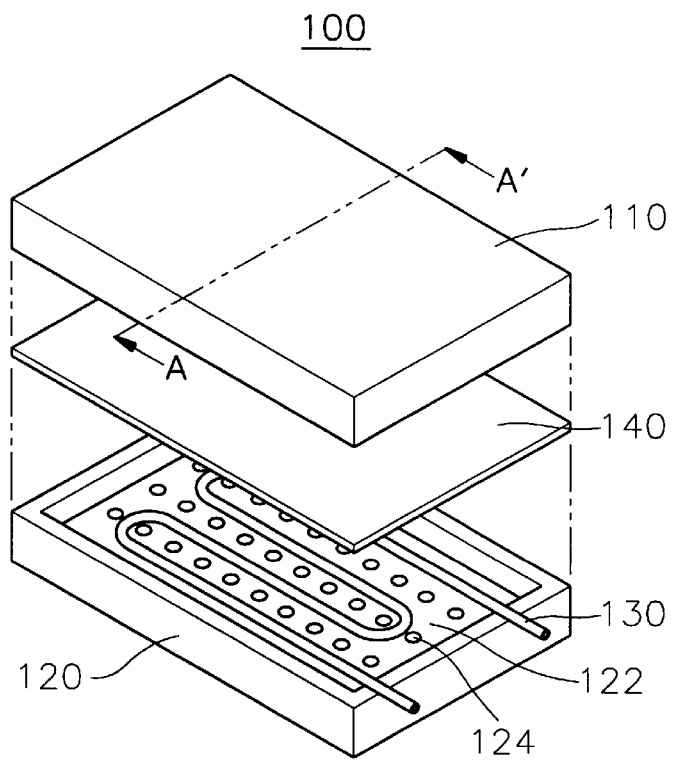
FIG. 4 is a perspective view showing a method of vacuum molding according to an embodiments of the present invention, in which a tube is integrally combined with a heat discharging plate by using upper and lower molding jigs.
Figure 5:
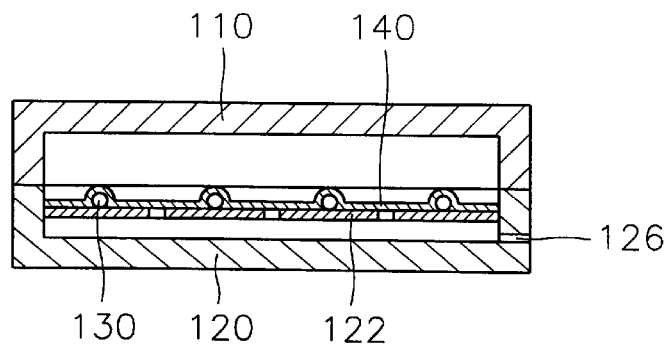
FIG. 5 is a sectional view of the upper and lower molding jigs engaged with each other in order to manufacture a condenser by using the method of the vacuum molding according to the embodiment of the present invention.

FIG. 4 is a perspective view showing a method of vacuum molding according to an embodiment of the present invention, in which a tube 130 is integrally combined with a heat discharging plate 140 by using upper and lower molding jigs 110 and 120, and FIG. 5 is a sectional view of upper and lower molding jigs 110 and 120 engaged with each other in order to manufacture a condenser 200 by using the method of the vacuum molding according to the embodiment of the present invention.

Referring to FIGS. 4 and 5, there are shown vacuum molding jigs 100 to be used for carrying out the method of manufacturing condenser 200 for the refrigerator according to the embodiment of the present invention. Vacuum molding jigs 100 include upper molding jig 110 and lower molding jig 120.

Upper molding jig 110 and lower molding jig 120 have a square shape with a desired size. Lower molding jig 120 has a tube supporting plate 122 which is disposed to a position at a predetermined distance from a bottom surface thereof so as to receive and support heat discharging tube 130. A plurality of thruholes 124 and perforated in tube supporting plate 122 and have diameters of 0.8 mm to 1.2 mm. An aperture 126 is formed at a lower portion of a side wall of lower molding jig 120. An air pump (not shown) is connected to an outer opening of aperture 126, and discharges and supplies air through aperture 126.

A pair of grooves are formed at a predetermined distance from each other on a top portion of a front wall of lower molding jig 120 and have a semicircular shape and the same diameter as that of heat discharging tube 130.

Hereinafter, a process for carrying out the method of manufacturing condenser 200 for the refrigerator according to the present invention will be described.

At step (1), preheated heat discharging tube 130 is disposed on lower molding jig 120. At this time, heat discharging tube 130 is disposed on lower molding jig 120 in such a manner that both ends of heat discharging tube 130 are respectively positioned at each of grooves formed on the top portion of the front wall of lower molding jig 120, and the rest of heat discharging tube 130 is positioned on tube supporting plate 122.

At step (2), heat discharging plate 140 is covered over heat discharging tube 130 disposed on tube supporting plate 122 of lower molding jig 120. Heat discharging plate 140 is molded by ABS resin at a predetermined size to have a thickness of 0.6 mm. Heat discharging plate 140 is preheated at 300° C. for fifteen seconds carrying out step (2). Heat discharging plate 140 preheated by heaters (not shown) is transported by a transporting device (not shown) to a position over heat discharging tube 130 so that heat discharging tube 130 is covered therewith.

At step (3), upper molding jig 110 and lower molding jig 120 of vacuum molding jigs 100 are combined with each other in such a manner that bottom surfaces of side walls of upper molding jig 110 and top surfaces of side walls of lower molding jig 120 are tightly engaged with each other so as to maintain air sealing therebetween.

Referring again to FIG. 5 with respect to the step (4), at the step (4), air is pumped through aperture 126 formed at the side wall of lower molding jig 120 from a space defined between the bottom surface of lower molding jig 120 and heat discharging plate 140 to outside so that the space between the bottom surface of lower molding jig 120 and heat discharging plate 140 is in a vacuum state. Thus, heat discharging plate 140 is closely adhered around an outer surface of heat discharging tube 130 and is simultaneously adhered to tube supporting plate 122 by a vacuum-sucking force so as to be integrated with heat discharging tube 130. A degree of vacuum in the space between lower molting jig 120 and heat discharging plate 140 is maintained at about 0.987.

At step (5), heat discharging plate 140 is cooled by air while combining heat discharging plate 140 to heat discharging tube 130 after separating upper molding jig 110 and lower molding jig 120 of vacuum molding jigs 100 from each other. A blower (not shown) is used as a device which cools heat discharging plate 140. Accordingly, heat discharging plate 140 is rigidly attached to heat discharging tube 130.

Finally at step (6), air is pumped through aperture 126 formed at the side wall of lower molding jig 120 from outside of vacuum molding jigs 100 to the space defined between the bottom surface of lower molding jig 120 and heat discharging plate 140 so that the combination of heat discharging tube 130 and heat discharging plate 140 is separated from lower molding jig 120 by using an air pressure.

Figure 6A:
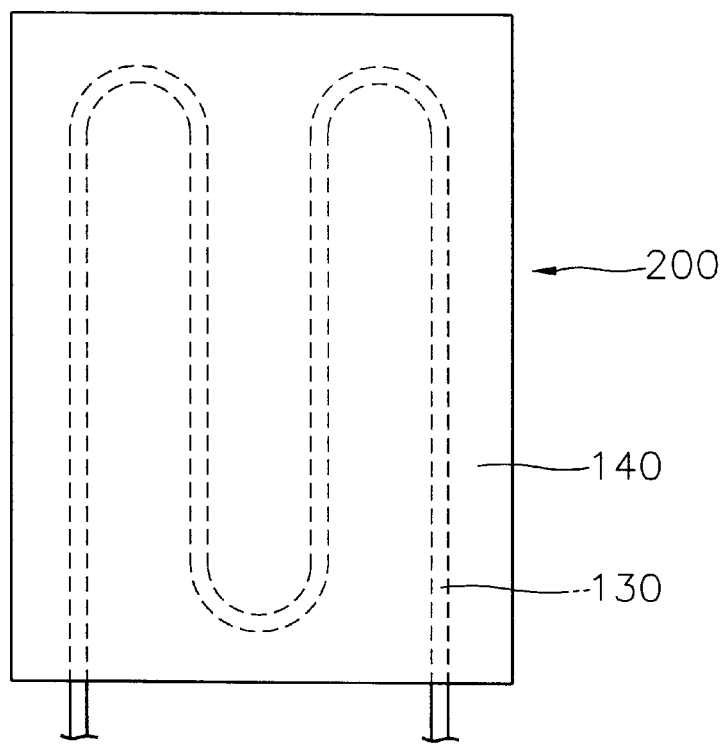
Figure 6B:
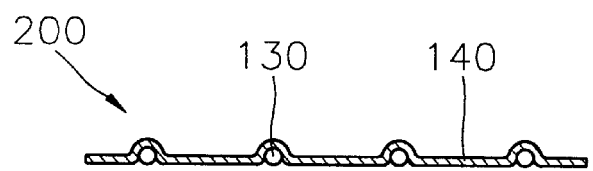

FIGS. 6A, 6B show condenser 200 manufactured by using the method of the vacuum molding according to the embodiment of the present invention, in which FIG. 6A is a plan view of condenser 200 and FIG. 6B is sectional view of condenser 200. As shown in FIGS. 6A and 6B, it can be noted that condenser 200 manufactured by the method according to the present invention has a better external appearance than that of a condenser made by welding and bending a tube to an extended metal.

As described above, when manufacturing the condenser for the refrigerator according to the method of manufacturing the condenser for the refrigerator of the present invention, it is possible to improve heat discharging efficiency of the condenser by integrally combining the heat discharging tube of the condenser with the heat discharging plate made of ABS resin, while it can be possible to improve an external appearance of the refrigerator by covering the rear portion of the refrigerator with the condenser.

Furthermore, since the method of manufacturing the condenser for the refrigerator according to the present invention does not require the heat discharging tube to be welded or bonded to the heat discharging plate or expanded metal, the manufacturing process of the condenser for the refrigerator is simplified, so the condenser for the refrigerator can be easily manufactured.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A method of manufacturing a condenser for a refrigerator comprising the steps of:

(1) disposing a heat discharging tube on a lower molding jig;

(2) covering said heat discharging tube with a heat discharging plate;

(3) combining an upper molding jig and said lower molding jig to each other;

(4) discharging air between said lower molding jig and said heat discharging plate to create a vacuum in a space therebetween so that said heat discharging plate is combined with said heat discharging tube by a vacuum-sucking force;

(5) cooling said heat discharging plate while combining said heat discharging plate with said heat discharging tube after separating said upper molding jig from said lower molding jig, thereby integrally combining said heat discharging plate with said heat discharging tube; and (6) separating said heat discharging plate which has been integrally combined with said heat discharging tube from said lower molding jig, thereby providing the condenser having said heat discharging tube which is integrally combined with said heat discharging plate.

2. A method of manufacturing a condenser for a refrigerator as claimed in claim 1, further comprising the step of preheating said heat discharging plate at a predetermined temperature before the step (2).

3. A method of manufacturing a condenser for a refrigerator as claimed in claim 2, wherein in the preheating step, said heat discharging plate it heated at 300° C. for fifteen seconds by means of heaters, and wherein said heat discharging plate is made of acrylonitrile-butadiene-styrene resin and has a thickness of 0.6 mm.

4. A method of manufacturing a condenser for a refrigerator as claimed in claim 1, wherein a the vacuum between said heat discharging plate and said lower molding jig at the step (4) is about 0.987.

5. A method of manufacturing a condenser for a refrigerator as claimed in claim 1, wherein said upper and lower molding jigs have a square shape, and wherein said lower molding jig has a tube supporting plate disposed to a portion at a predetermined distance apart from a bottom surface of said lower molding jig and said tube supporting plate has a plurality of thruholes therein.

6. A method of manufacturing a condenser for a refrigerator as claimed in claim 5, wherein diameters of the thruholes perforated in said tube supporting plate of said lower molding jig are about 0.8 mm to 1.2 mm.

7. A method of manufacturing a condenser for a refrigerator as claimed in claim 1, wherein the step (5), said heat discharging plate is cooled by air.

8. A method of manufacturing a condenser for a refrigerator as claimed in claim 1, wherein at step (6), air is supplied between said heat discharging plate and said lower molding jig through aperture formed at a lower portion of a side wall of said lower molding jig so that a combined structure of said heat discharging tube and said heat discharging plate is separated from said lower molding jig.

* * * * *